United States Patent [19]

Pan

[11] Patent Number: 5,550,650
[45] Date of Patent: Aug. 27, 1996

[54] SHEET-FEED SCANNER FOR TRANSMISSIVE AND REFLECTIVE DOCUMENTS

[75] Inventor: Ampere Pan, Taipei Hsien, Taiwan

[73] Assignee: Primax Electronics Ltd., Taipei Hsien, Taiwan

[21] Appl. No.: 332,710

[22] Filed: Nov. 1, 1994

[51] Int. Cl.[6] .......................... H04N 1/024; H04N 1/04; G03B 27/48; B65H 5/22
[52] U.S. Cl. .......................... 358/474; 358/473; 358/487; 358/496; 358/498; 355/50; 271/3.2; 271/272; 271/273
[58] Field of Search .................................. 358/473, 474, 358/475, 484, 487, 496, 498, 497, 296; 355/50; 271/3.2, 274, 272, 273; H04N 1/024, 1/04; B65H 5/22; G03B 27/48

[56] References Cited

U.S. PATENT DOCUMENTS

| | | | |
|---|---|---|---|
| 4,473,848 | 9/1984 | Juergensen | 358/487 |
| 4,839,730 | 6/1989 | Shirakoshi et al. | 358/483 |
| 5,140,442 | 8/1992 | Shigemura et al. | 358/473 |
| 5,182,450 | 1/1993 | Pan | 358/473 |
| 5,212,376 | 5/1993 | Liang | 358/484 |
| 5,282,081 | 1/1994 | Chen et al. | 358/474 |
| 5,325,217 | 1/1994 | Nagler et al. | 358/487 |
| 5,333,066 | 7/1994 | Sugata | 358/474 |
| 5,412,490 | 5/1995 | Kojima et al. | 358/473 |

*Primary Examiner*—Kim Yen Vu
*Assistant Examiner*—Kimberly A. Williams
*Attorney, Agent, or Firm*—Madson & Metcalf

[57] ABSTRACT

The present invention provides a double function-mode scanner. It includes a scanner body scanning a content of an article to be scanned, and a feeder connected to the scanner body to have the article transmitted through a passage between the scanner body and the feeder so that the content of the article can be scanned and having a light source for allowing the sheet-feed scanner to perform not only a reflection-mode scanning but a penetration-mode scanning.

17 Claims, 3 Drawing Sheets

SHEET-FEED SCANNER FOR TRANSMISSIVE AND REFLECTIVE DOCUMENTS

FIELD OF THE INVENTION

The present invention is related to a scanner, and more particular to a sheet-feed scanner.

BACKGROUND OF THE INVENTION

A conventional sheet-feed scanner includes a scanner 11 and a feeder 12, as shown in FIG. 1. An article is automatically fed through a passage 13 between the scanner 11 and the feeder 12 to be scanned by way of the frictional force generated when rollers 111 of the scanner 11 and rollers 121 of the feeder 12 rotate, and therefore the whole article can be scanned. When the article is passing through the passage 13, a light source 112 included in the scanner 11 emits a light on the surface of the article and the light is then reflected from the surface of the article to a CCD 113 of the scanner 11 which converts the reflected light into an electric signal. The electric signal is processed by a circuit in the scanner 11 to have the contents of the scanned article shown on the monitor of the computer or printed by a printer.

The aforementioned conventional sheet-feed scanner only possesses a light source installed in the scanner 11 so that the scanner 11 cannot receive the reflected light to perform signal-conversion in the CCD 113 if the article is light-penetrating, e.g. transparent, rather than light-reflecting. Therefore, the conventional scanner can only perform a reflection-mode scanning, and more particularly, it can only allow some specific kinds of articles, e.g. a name card, a picture, a credit card, etc., to be scanned.

SUMMARY OF THE INVENTION

An object of the present invention is to provide a sheet-feed scanner which can perform not only reflection-mode scanning but also penetration-mode scanning.

In accordance with the present invention, a sheet-feed scanner includes a scanner body scanning a content of an article to be scanned, and a feeder connected to the scanner body to have the article transmitted through a passage between the scanner body and the feeder so that the content of the article can be scanned and having a light source for allowing the sheet-feed scanner to perform a penetration-mode scanning, wherein the feeder may be either detachably or undetachably secured to the scanner body.

The scanner body further includes an additional light source, e.g. a cold cathode fluorescent tube (CCFT) or a light-emitting diode (LED) array, for allowing the sheet-feed scanner to perform a reflection-mode scanning which is a process that the sheet-feed scanner scans a light-reflective article, e.g. a picture, a name card or a credit card, which can reflect a light emitted to a surface thereof.

In accordance with another aspect of the present invention, the scanner body is a handheld scanner, and the feeder includes a lower shell, an upper shell having a surface mounting thereon the light source emitting a light which penetrates through the article to allow the sheet-feed scanner to perform the penetration-mode scanning, a roller partly protruding from the surface of the upper surface, a driving device driving the roller to rotate, a transmission device engaged between the roller and the driving device for moderating a rotation torsion and a rotation speed of the roller driven by the driving device, a transmission-pressure adjusting device mounted under the roller for allowing articles with different thicknesses to pass the passage, and a power contact mounted on the upper shell for transmitting power from the scamper body to the driving device. The light source, the roller, the driving device, and the transmission device are installed in a floating box in the upper shell and the transmission-pressure adjusting device is installed between the floating box and the lower shell.

In accordance with another aspect of the present invention, the light source is a CCFT, the driving device is a motor, the transmission device is a gear assembly and the transmission-pressure adjusting device is a spring. The sheet-feed scanner further includes a dispersion film for evenly dispersing the light on the article.

The present invention can perform penetration-mode scanning which is a process that the sheet-feed scanner scans a light-penetrating article, e.g. a picture film, a projection film or a slide film, which can allow a light emitted thereto to penetrate therethrough.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
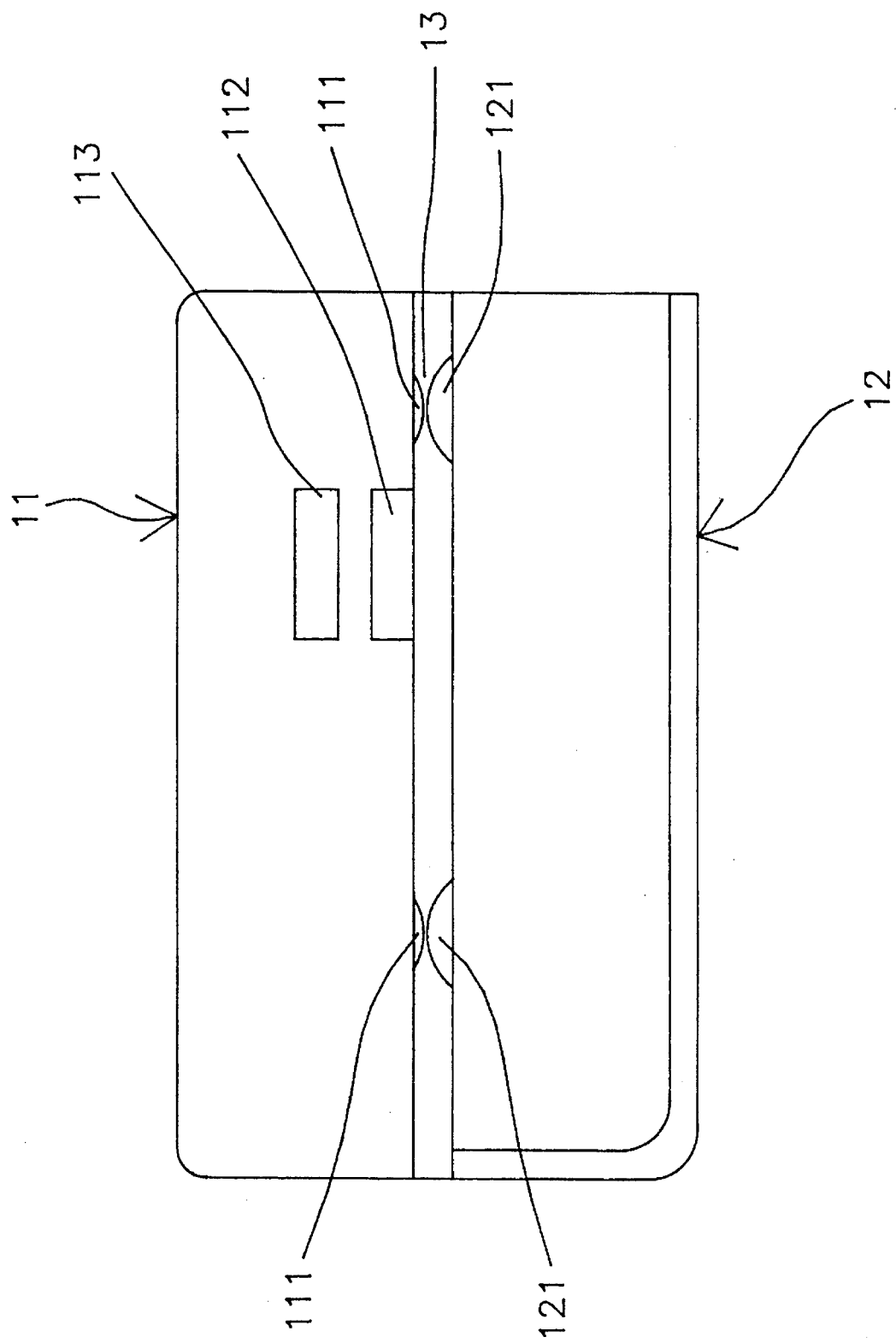
FIG. 1 is a schematic diagram showing main parts of a conventional sheet-feed scanner.
Figure 2:
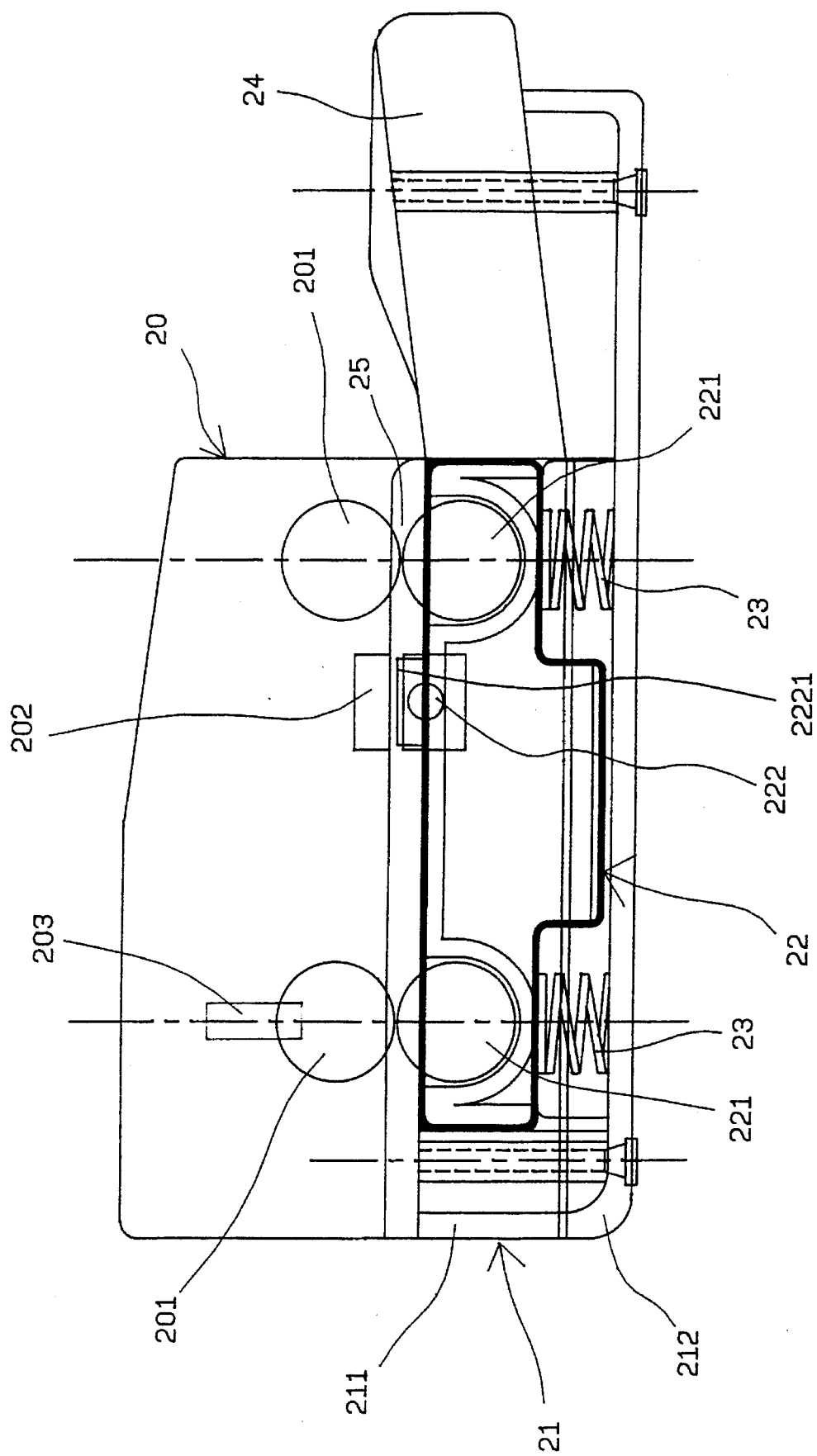
FIG. 2 is a schematic side view of a preferred embodiment of a sheet-feed scanner according to the present invention.
Figure 3:
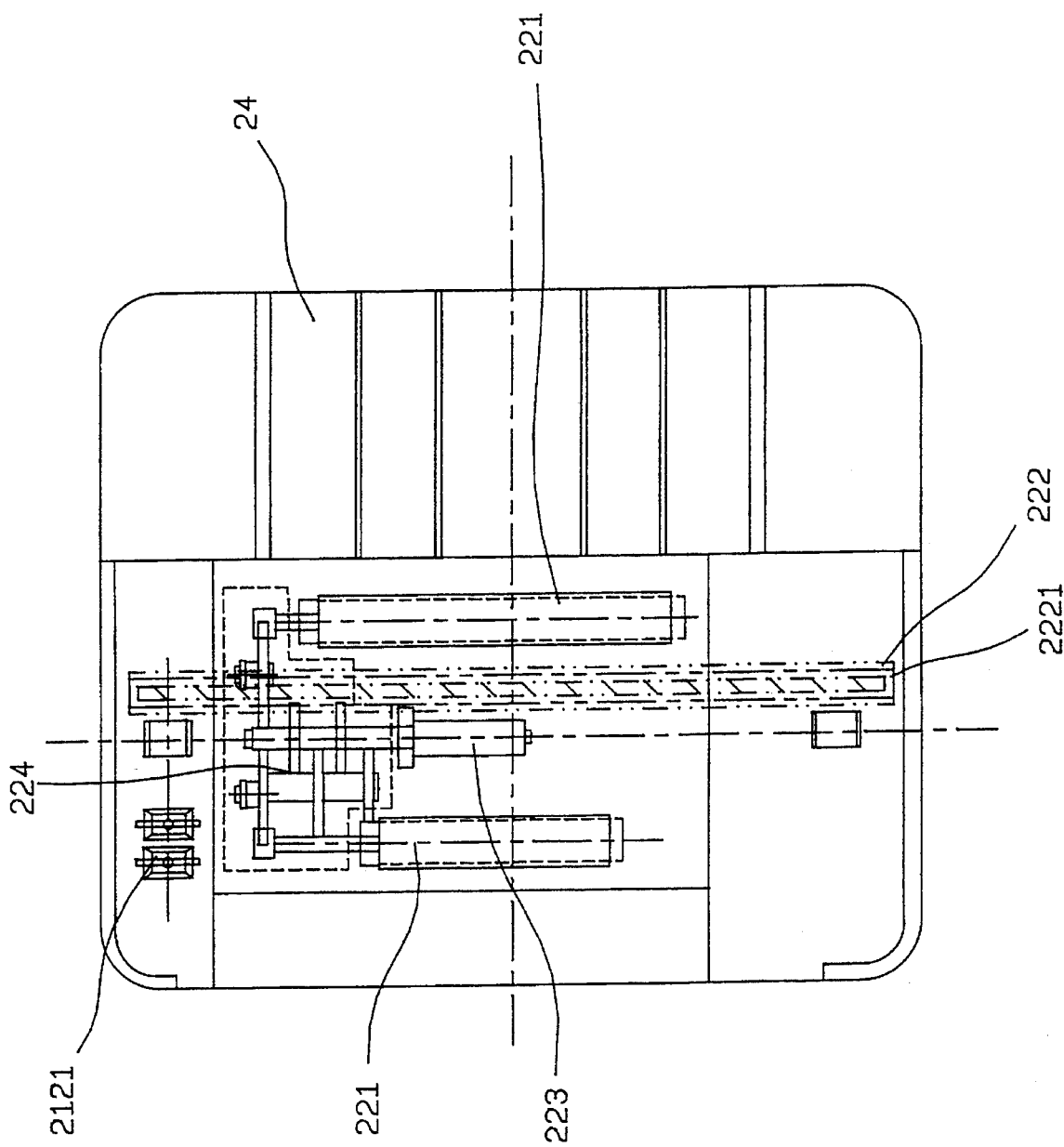
FIG. 3 is a schematic top view of a preferred embodiment of a sheet-feed scanner according to the present invention.

Please refer to FIGS. 2 and 3 which are respectively a schematic side and top views of a preferred embodiment of a sheet-feed scanner according to the present invention. The present sheet-feed scanner includes a scanner body, e.g. a hand held scanner, and a feeder which can be undetachably secured together. The preferred embodiment of the present invention of FIG. 2 includes a handheld scanner 20 which includes rollers 201, a light source 202, e.g. a CCFT, and a CCD 203, and a feeder 21 which includes an upper shell 211, a lower shell 212, a floating box 22, rollers 221, a light source 222, e.g. a CCFT, a dispersion film 2221, a transmission-pressure adjusting device 23, e.g. a spring, and a plate 24. In FIG. 3, a driving device 223, e.g. a motor, a transmission device 224, e.g. a gear assembly, and power contacts 2121 are respectively shown.

The present invention is able to perform reflection-mode scanning or penetration-mode scanning according to the kind of scanned article, and the existence of the spring 23 facilitates the adjustment of the transmission pressure to allow the articles of different thicknesses to pass through a passage 25 between the rollers of the handheld scanner 20 and the rollers of the feeder 21.

1. Reflection-mode Scanning:

Place a light-reflecting article on the plate 24, and push the article into the entrance of the passage 25 between the rollers 201 and 221 respectively of the scanner 20 and the feeder 21. The motor 223 obtains power through the power contacts 2121 from the scanner 20 to drive the gear assembly 224 which further enables the rollers 221 to rotate. The whole article is driven to pass under the scanner 20 by the frictional force caused by the rotation of the rollers 221 and 201. Because the light emitted from the light source 202 of the scanner 20 can be reflected by the light-reflecting article and received and converted into electric signals by the CCD 203, the content of the scanned article can be shown on the monitor of the computer or printed out. As for the working principle of the handheld scanner, one skilled in the art will certainly be familiar with it so that the principle would not be described here.

2. Penetration-mode Scanning:

The penetration-mode scanning is a process that the sheet-feed scanner scans a light-penetrating article, e.g. a picture film, a projection film or a slide film, which can allow a light emitted thereto to penetrate therethrough. When the penetration-mode scanning is performed, the light received by the CCD 203 is that emitted by the light source 222 of the feeder 21 because the light emitted by the light source 222 can penetrate through the article to get to the CCD 203. The dispersion film 2221 is mounted on the light source 222 for having the light evenly dispersed on the whole surface of the article. After the CCD 203 receives and processes the light, the scanner and the computer will execute the next steps to finish the penetration-mode scanning.

To sum up, the present invention utilizes the light source of the scanner to proceed the conventional reflection-mode scanning and utilizes the light source of the feeder to proceed the penetration-mode scanning. Therefore, no matter what the article is light-reflecting or light-penetrating, it can be scanned by using the present invention.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet-feed scanner comprising:

a scanner body including a scanner roller and scanning a content of an article to be scanned;

a feeder including a feeder roller in contact with said scanner roller for transmitting said article through a passage between said scanner body and said feeder by a frictional force caused by the rotation of said scanner roller and said feeder roller to have said content of said article scanned, said feeder having a light source for allowing said sheet-feed scanner to perform a penetration-mode scanning, wherein said passage follows a substantially linear path to facilitate the passing of various articles, said feeder including:

a lower shell;

an upper shell having a surface mounting thereon said light source emitting a light which penetrates through said article to allow said sheet-feed scanner to perform said penetration-mode scanning;

said feeder roller partly protruding from said surface of said upper shell;

a driving device driving said feeder roller to rotate;

a transmission device engaged between said feeder roller and said driving device for moderating a rotation torsion and a rotation speed of said feeder roller driven by said driving device;

a transmission-pressure adjusting device mounted under said feeder roller for allowing articles with different thicknesses to pass said passage; and a power contact mounted on said upper shell for transmitting power from said scanner body to said driving device.

2. A sheet feed scanner according to claim 1 wherein said feeder is undetachably secured to said scanner body.

3. A sheet feed scanner according to claim 1 wherein said scanner body further includes an additional light source for allowing said sheet-feed scanner to perform a reflection-mode scanning.

4. A sheet-feed scanner according to claim 3 wherein said reflection-mode scanning is a process that said sheet-feed scanner scans a light-reflective article which can reflect a light emitted to a surface thereof.

5. A sheet-feed scanner according to claim 4 wherein said light-reflective article is one selected from a group consisting of a picture, a name card and a credit card.

6. A sheet-feed scanner according to claim 3 wherein said additional light source is a CCFT.

7. A sheet-feed scanner according to claim 3 wherein said additional light source is an LED array.

8. A sheet-feed scanner according to claim 1 wherein said scanner body is a handheld scanner.

9. A sheet-feed scanner according to claim 1 further comprising a dispersion film for evenly dispersing said light on said article.

10. A sheet-feed scanner according to claim 1 wherein said light source, said roller, said driving device, and said transmission device are installed in a floating box in said upper shell.

11. A sheet-feed scanner according to claim 10 wherein said transmission-pressure adjusting device is installed between said floating box and said lower shell.

12. A sheet-feed scanner according to claim 1 wherein said light source is a CCFT.

13. A sheet-feed scanner according to claim 1 wherein said driving device is a motor.

14. A sheet-feed scanner according to claim 1 wherein said transmission device is a gear assembly.

15. A sheet-feed scanner according to claim 1 wherein said transmission-pressure adjusting device is a spring.

16. A sheet-feed scanner according to claim 1 wherein said penetration-mode scanning is a process that said sheet-feed scanner scans a light-penetrating article which can allow a light emitted thereto to penetrate therethrough.

17. A sheet-feed scanner according to claim 16 wherein said light-penetrating article is one selected from a group consisting of a picture film, a projection film and a slide film.

* * * * *